US010565172B2

(12) United States Patent
Arning et al.

(10) Patent No.: US 10,565,172 B2
(45) Date of Patent: Feb. 18, 2020

(54) ADJUSTING APPLICATION OF A SET OF DATA QUALITY RULES BASED ON DATA ANALYSIS

(71) Applicant: International Business Machines Corporation, Armonk, NY (US)

(72) Inventors: Andreas Arning, Tuebingen (DE); Werner Schuetz, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/441,556

(22) Filed: Feb. 24, 2017

(65) Prior Publication Data
US 2018/0246912 A1    Aug. 30, 2018

(51) Int. Cl.
G06F 16/215    (2019.01)
G06F 16/25     (2019.01)

(52) U.S. Cl.
CPC .......... G06F 16/215 (2019.01); G06F 16/254 (2019.01)

(58) Field of Classification Search
CPC .............................. G06F 16/215; G06F 16/254
See application file for complete search history.

(56) References Cited

U.S. PATENT DOCUMENTS

| 2002/0161778 | A1  | 10/2002 | Linstedt |           |
|--------------|-----|---------|----------|-----------|
| 2008/0140602 | A1* | 6/2008  | Roth     | G06F 17/30303 706/59 |
| 2013/0031044 | A1* | 1/2013  | Miranda  | G06N 5/025 706/47 |
| 2013/0166515 | A1  | 6/2013  | Kung et al. | |
| 2014/0188784 | A1  | 7/2014  | Guerra   | |
| 2015/0120604 | A1  | 4/2015  | Xu et al. | |

OTHER PUBLICATIONS

Daniel et al., "Managing Data Quality in Business Intelligence Applications", VLDB '08, Aug. 2008, VLDB Endowment, 11 pages.
Jain et al., "Data Lineage: An Important First Step for Data Governance", BeyeNETWORK, Aug. 2013, http://www.b-eye-network.com/view/17023, retrieved from internet Dec. 2016, 5 pages.
"Exploring Data Lineage: Get a Complete Picture of Your Data Flows", IBM, Jan. 2010, http://www.ibm.com/developerworks/data/library/techarticle/dm-1001datalineageinfosphereworkbench/, retrieved from internet Sep. 2016, 13 pages.
Lee, "Information Quality Assessment for Asset Management Systems", abstract from Information Quality and Governance for Business Intelligence, Chapter 7, IGI Global, 2014, 3 pages.

* cited by examiner

*Primary Examiner* — Boris Gorney
*Assistant Examiner* — Christy Y Kim
(74) *Attorney, Agent, or Firm* — Robert Bunker; Edell, Shapiro & Finnan, LLC

(57) ABSTRACT

A present invention embodiment adjusts application of a set of data quality rules for data within one or more reports. A first report field is selected that receives data from a same source data field as at least one second report field within the one or more reports. An active data quality rule associated with the at least one second report field is identified that is inactive for the first report field. An effectiveness of the identified data quality rule is determined for data quality of the first report field. Application of a set of data quality rules is adjusted for the first report field to include the identified data quality rule in response to the effectiveness satisfying a threshold.

18 Claims, 3 Drawing Sheets

US 10,565,172 B2

ADJUSTING APPLICATION OF A SET OF DATA QUALITY RULES BASED ON DATA ANALYSIS

BACKGROUND

1. Technical Field

Present invention embodiments relate to monitoring of data quality for data management systems, and more specifically, to adjusting application of a set of data quality rules based on an analysis of data to enhance the data quality for business intelligence (BI) and/or other reports.

2. Discussion of the Related Art

The quality of decisions rendered from business intelligence (BI) reports is highly correlated to the quality of data within these reports. In other words, a BI report containing data with poor quality may lead to inappropriate business decisions. Accordingly, data quality rules may be employed to identify and eliminate erroneous data within these reports.

SUMMARY

According to one embodiment of the present invention, a system for adjusting application of a set of data quality rules for data within one or more reports comprises at least one processor. The system selects a first report field receiving data from a same source data field as at least one second report field within the one or more reports. An active data quality rule associated with the at least one second report field is identified that is inactive for the first report field. An effectiveness of the identified data quality rule is determined for data quality of the first report field. Application of a set of data quality rules is adjusted for the first report field to include the identified data quality rule in response to the effectiveness satisfying a threshold. Embodiments of the present invention further include a method and computer program product for adjusting application of a set of data quality rules for data within one or more reports in substantially the same manner described above.

BRIEF DESCRIPTION OF THE DRAWINGS

Generally, like reference numerals in the various figures are utilized to designate like components.

DETAILED DESCRIPTION

Embodiments of the present invention enhance data quality of business intelligence (BI) or other reports by analyzing the data lineage of the BI report and determining recommendations for additional data quality rules. The embodiments of the present invention initially examine the BI or other reports and associated metadata definitions. Data quality or validation rules employed according to report specifications are analyzed, and source data sets used in several Extract, Transform, and Load (ETL) stages are determined based on data lineage. Possibly unused data quality rules for data within a report data set are identified and proposed for use in order to further improve the data quality.

In other words, present invention embodiments determine report fields of business intelligence (BI) or other reports associated with the same or common source data fields. The data quality or validation rules used for the report fields are identified, where an identified data quality rule is inactive for one or more of the report fields. The effectiveness of the identified data quality rule is evaluated for the one or more report fields for which that data quality rule is inactive. The identified data quality rule is subsequently enabled for each of the evaluated one or more report fields in response to the effectiveness indicating that the data quality rule enhances data quality for that report field.

Figure 1:
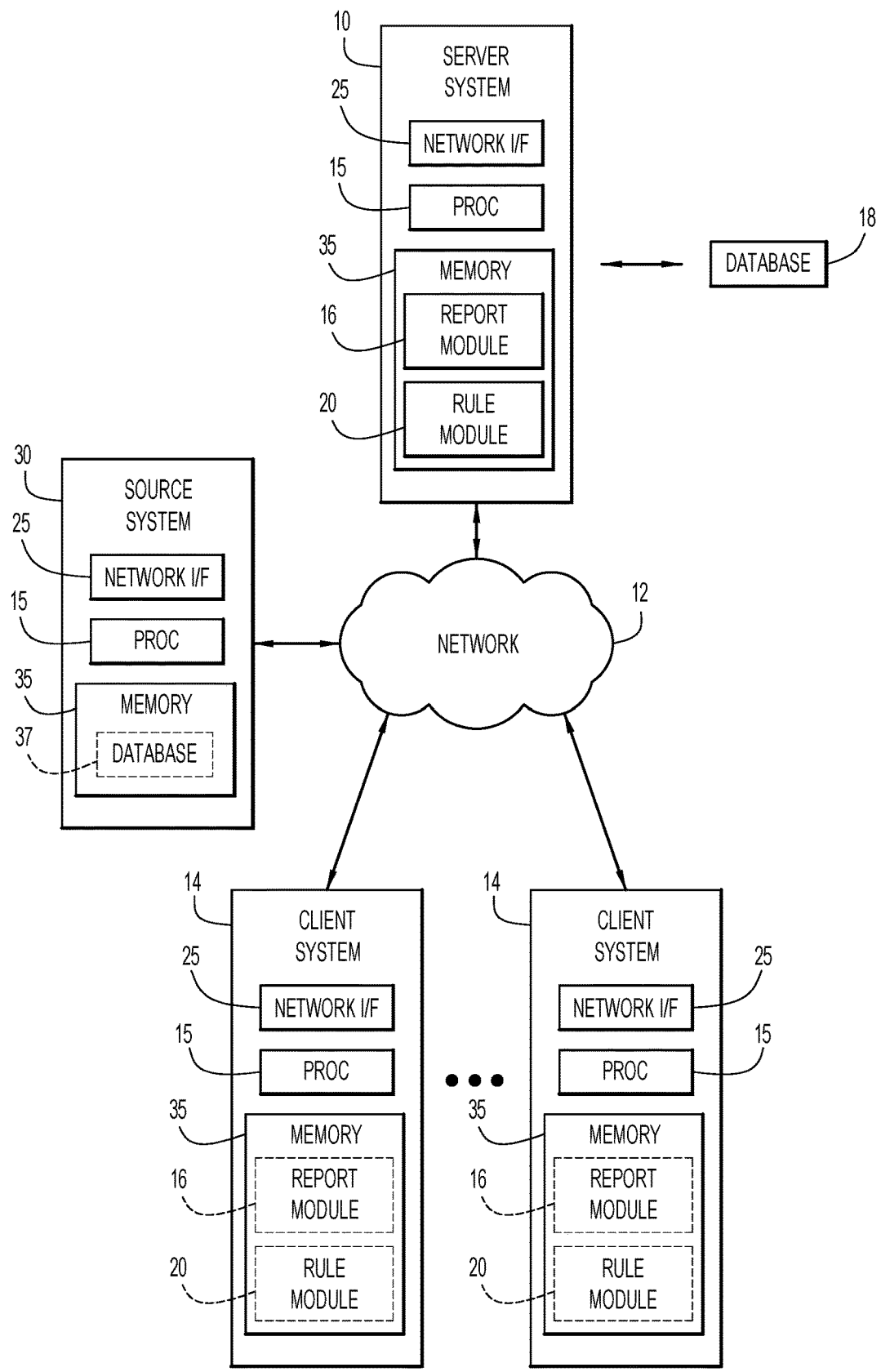
FIG. 1 is a diagrammatic illustration of an example computing environment for use with an embodiment of the present invention.

An example computing environment for use with present invention embodiments is illustrated in FIG. 1. Specifically, the computing environment includes one or more server systems 10, one or more client or end-user systems 14, and one or more source systems 30. Server systems 10, client systems 14, and source systems 30 may be remote from each other and communicate over a network 12. The network may be implemented by any number of any suitable communications media (e.g., wide area network (WAN), local area network (LAN), Internet, Intranet, etc.). Alternatively, server systems 10, client systems 14, and source systems 30 may be local to each other, and communicate via any appropriate local communication medium (e.g., local area network (LAN), hardwire, wireless link, Intranet, etc.).

Client systems 14 enable users to submit requests to server systems 10 for generation of reports (e.g., business intelligence (BI) or other reports) and data quality analysis. The server systems include a report module 16 to generate a report with data from source systems 30, and a rule module 20 to analyze data of one or more reports and adjust data quality rules for enhanced data quality. One or more database systems 18 may store various information for the analysis (e.g., data quality rules, data lineage information, status and/or mapping of data quality rules to data fields, reports, etc.). The database system may be implemented by any conventional or other database or storage unit, may be local to or remote from server systems 10, client systems 14, and source systems 30, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired reports and analysis, and may provide various information including the generated reports and analysis results (e.g., report, data quality rules proposed, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, report module, rule module, browser/interface software, etc.).

Source systems 30 may be implemented by any conventional or other computer systems preferably equipped with at least one processor 15, one or more memories 35, and/or internal or external network interfaces or communications devices 25 (e.g., modem, network cards, etc.). The source systems may further include or be coupled to a database or other storage system 37 to store various types of data (e.g., for generation of business intelligence (BI) or other types of reports).

Alternatively, one or more client systems 14 may generate reports and analyze data quality when operating as a stand-alone unit. In a stand-alone mode of operation, the client system stores or has access to the data (e.g., reports, data quality rules, etc.), and includes the report module 16 to generate reports and rule module 20 to analyze data of one or more reports and adjust data quality rules for enhanced data quality as described above. The graphical user (e.g., GUI, etc.) or other interface (e.g., command line prompts, menu screens, etc.) solicits information from a corresponding user pertaining to the desired report and analysis, and may provide information including the generated reports and analysis results (e.g., report, data quality rules proposed, etc.).

Report module 16 and rule module 20 may be on the same or different servers, and include any modules or units to perform the various functions of present invention embodiments described below. The various modules may be implemented by any combination of any quantity of software and/or hardware modules or units, and may reside within memory 35 of the server and/or client systems for execution by processor 15.

An embodiment of the present invention enhances data quality of business intelligence (BI) or other reports by suggesting use of appropriate data quality rules. Initially, all relevant data items (e.g., report fields, database table columns, file data fields, etc.) are determined for one or more specific report objects (e.g., list, chart, etc.). Stages of defined Extract, Transform, and Load (ETL) processes are evaluated according to data lineage to identify source data fields of source systems 30 for the report objects. If plural target data fields (e.g., database table columns, file data fields, etc.), corresponding to and storing data for the report fields (e.g., on server systems 10 and/or client systems 14), are linked to the same source data field, all potential data quality rules that are employed in the ETL processes are determined. A data quality rule that is active for some (e.g., but not all) of the linked target data fields (e.g., database table columns, file data fields, etc.) is identified, and the presence of a report filter for a linked target data field or report field for which the identified data quality rule is inactive is determined. If the report filter is present, at least one filtered report field matching an exception record generated by the identified data quality rule is determined. The exception records represent data records violating the identified data quality rule.

When a data quality rule is identified (without a report filter), or a data quality rule is identified with a report filter that produces at least one filtered report field matching an exception record generated by the identified data quality rule, a quality improvement caused by using the identified data quality rule (for the target data field or report field where the identified data quality rule is inactive) is examined. If the quality improvement caused by use of the identified data quality rule satisfies a threshold (e.g., a reasonable percentage of false positives), the identified data quality rule is proposed for use for the target data field or report field where the identified data quality rule is inactive.

Figure 2:
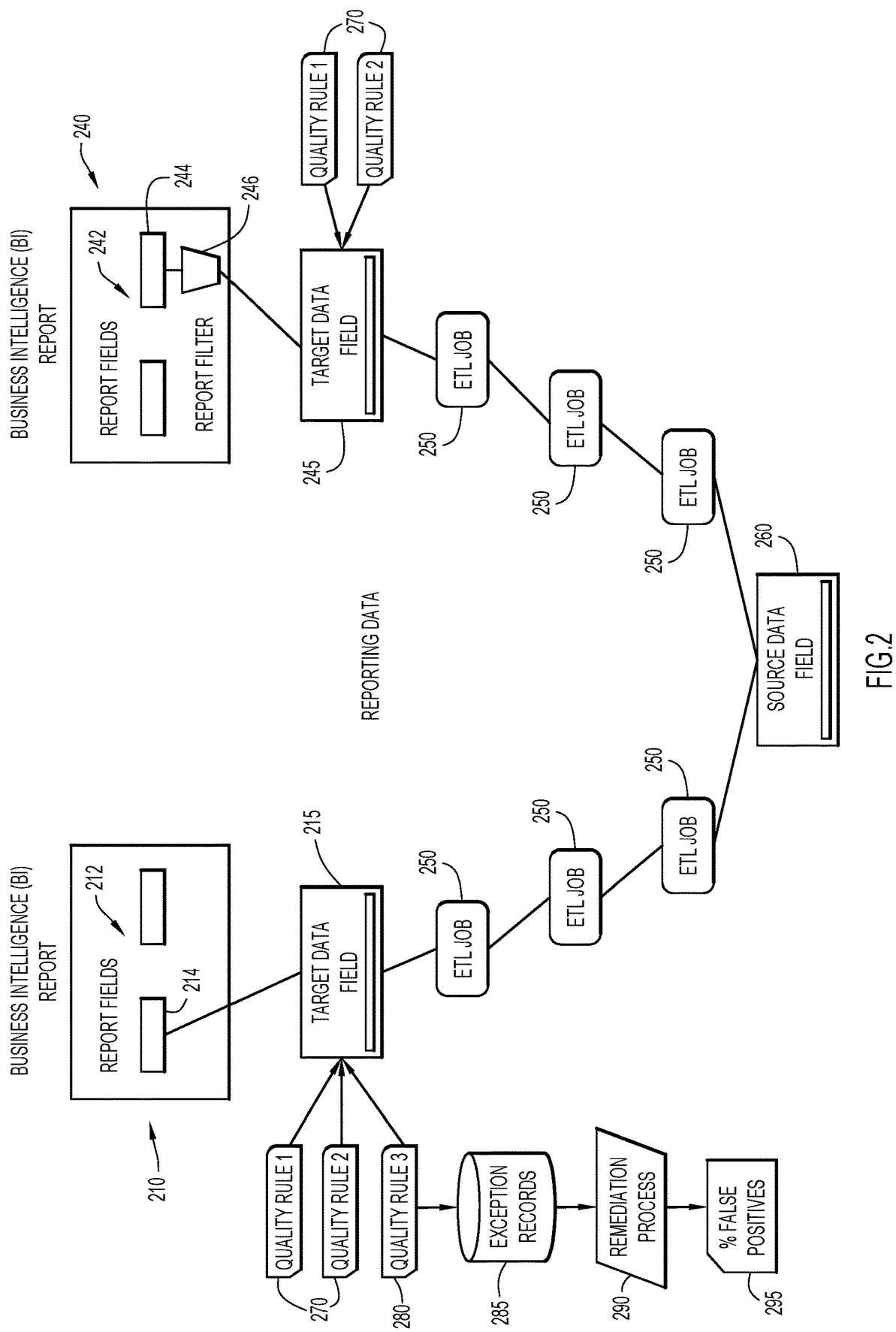
FIG. 2 is a diagrammatic illustration of an example of adjusting data quality rules for report fields according to an embodiment of the present invention.

An example of analyzing a report and adjusting a set of data quality rules for a report field according to an embodiment of the present invention is illustrated in FIG. 2. Initially, a business intelligence (BI) report 210 includes a plurality of report fields 212, while a BI report 240 includes a plurality of report fields 242. BI reports 210, 240 may be generated (e.g., by report module 16 of server systems 10 and/or client systems 14) based on queries for data from database tables or files (e.g., residing on one or more server systems 10 and/or client systems 14) storing data from source systems 30. The data on source systems 30 are stored within database tables or files of the source systems, and transformed via one or more Extract, Transform, and Load (ETL) processes or jobs 250 (e.g., of one or more server systems 10 and/or client systems 14) for transference to the database tables or files of server systems 10 and/or client systems 14 for generating reports.

A report field 214, 244 from each report 210, 240 is associated with a corresponding target data field 215, 245 (e.g., a database table column, a file data field, etc. of server systems 10 and/or client systems 14) that receives data for the report field from a database table or file of source system 30 (e.g., via ETL processes 250). The data for report fields 214, 244 are received from the same source data field 260 (e.g., database table column, file data field, etc.) within a source system 30 through a chain of Extract, Transform, and Load (ETL) processes or jobs 250. These ETL processes basically transform data from the source system to data compatible with server systems 10 (or database systems 18) and/or client systems 14 for generating reports 210, 240.

Target data fields 215, 245 have data quality or validation rules 270 (e.g., quality rule 1 and quality rule 2 as viewed in FIG. 2) bound thereto. The data quality rules may be weighted by their efficiency, and basically verify data within target data fields 215, 245 (and report fields 214, 244). Target data field 215 corresponding to BI report 210 is associated with an additional data quality or validation rule 280 (e.g., quality rule 3 as viewed in FIG. 2) that is not bound to target data field 245 corresponding to BI report 240. Accordingly, data quality rule 280 is identified for potential use with target data field 245 (and report field 244), and the effectiveness of data quality rule 280 is evaluated for target data field 245 for which that data quality rule is inactive. Data quality rule 280 is subsequently enabled for target data field 245 (and report field 244) in response to the effectiveness indicating that data quality rule 280 enhances data quality for target data field 245 (and report field 244) as described below.

Initially, report queries, report fields, and data sources associated with business intelligence report (BI) 210 are analyzed to identify all report fields 212 of that BI report via BI lineage. By way of example, a report field 214 of BI report 210 may be initially selected for processing. Data quality rules 270, 280 (e.g., quality rule 1, quality rule 2, and quality rule 3 as viewed in FIG. 2) are determined to be bound to target data field 215 providing data to selected report field 214.

Source data field 260 (e.g., database table column, file data field, etc.) from a source system 30 is identified as supplying data to selected report field 214. This may be accomplished by traversing the associated chain of Extract, Transform, and Load (ETL) processes 250 from selected report field 214 to source data field 260. Once source data field 260 is identified, the target data fields (e.g., database table columns, file data fields, etc.) bound to report fields of business intelligence (BI) reports 210, 240 and linked to identified source data field 260 are determined (e.g., via associated ETL chains as described above). In this example, source data field 260 is linked (or provides data) to target data fields 215, 245 that are bound to report fields 214, 244 of BI reports 210, 240. In other words, report fields 214, 244 each receive data from the same source data field for respective BI reports 210, 240.

Data quality rules 270, 280 are determined to be bound to, or active for, target data fields 215, 245 that receive data from the same source data field 260 and correspond to business intelligence (BI) report fields 214, 244. Accordingly, each data quality rule 270, 280 is examined to identify a data quality rule that is not active for one of the target data fields 215, 245 bound to report fields 214, 244. In this example, data quality rule 280 (e.g., quality rule 3 as viewed in FIG. 2) is identified as being inactive for target data field 245 (and corresponding report field 244 of BI report 240), and may be enabled for this target data field (and corresponding report field) to improve data quality as described below.

A report filter may be utilized for report generation to filter report data in accordance with a query utilized to retrieve the report data. For example, the query may contain one or more filtering criteria or conditions (e.g., date or numeric ranges, conditions specifying values, etc.). The filtering criteria may produce filtered data residing outside the scope of exception records detected by a data quality rule, thereby effectively obviating the data quality rule and producing no exception records (e.g., records with data failing to satisfy the data quality or validation rule). By way of example, a data quality rule may verify dates for a certain time period, and the filtering criteria may provide filtered data for a report outside of the certain time period. In this case, the data quality rule is ineffective for the filtered data and cannot improve data quality. In addition, when filtered data within the scope of the data quality rule do not match an exception record, this indicates that the data quality rule would always be satisfied by the filtered data, and similarly cannot improve data quality. Accordingly, a data quality rule is excluded from consideration in those instances where the data quality rule is ineffective and/or does not enhance the data quality.

The presence of a report filter is determined for report field 244 for which data quality rule 280 is inactive. In this example, a report filter 246 is bound to report field 244 of business intelligence (BI) report 240 to filter the report field based on a query with various criteria (e.g., dates, times, formats, etc.). Data quality rule 280 is applied to corresponding data of target data field 245 and produces exception records 285. The exception records include those data records that do not satisfy data quality rule 280. If the filtered report field does not match an exception record (e.g., indicating that the filtered report field satisfies data quality rule 280, or report filter 246 produces data residing outside the scope of data quality rule 280), data quality rule 280 may be excluded from consideration since inclusion of data quality rule 280 for report field 244 would be ineffective and/or not improve data quality for report field 244.

When the report filter is absent, or a filtered report field matches at least one exception record 285, the exception records generated by data quality rule 280 for target data field 245 are analyzed within a remediation process 290 according to their efficiency. In this example, exception records 285 generated by data quality rule 280 for target data field 245 are presented for correction (e.g., by the system or an administrator) in remediation process 290. A number of exception records that are corrected is determined and compared to a threshold. The number of corrected exception records may be utilized to determine a quantity or percentage of false positives 295 (e.g., exception records that do not need correcting but are identified as being an exception or non-compliant with data quality rule 280). For example, 100 exception records may be generated by data quality rule 280 and 90 of those exception records may be corrected. In this case, there exists 10 false positives or a false positive percentage of 10% (e.g., 10 records that do not need correcting (but were identified as an exception) divided by 100 total records). However, any suitable metric and threshold may be utilized (e.g., quantity of corrected exception records, percentage of corrected exception records, difference between corrected and uncorrected exception records, ratio of quantities of corrected and uncorrected exception records, etc.).

When the quantity or percentage exceeds or otherwise satisfies the threshold (e.g., greater than, less than, etc.), data quality rule 280 may be added to the set of data quality rules bound to and applied for target data field 245 (and report field 244) to enhance data quality.

Figure 3:
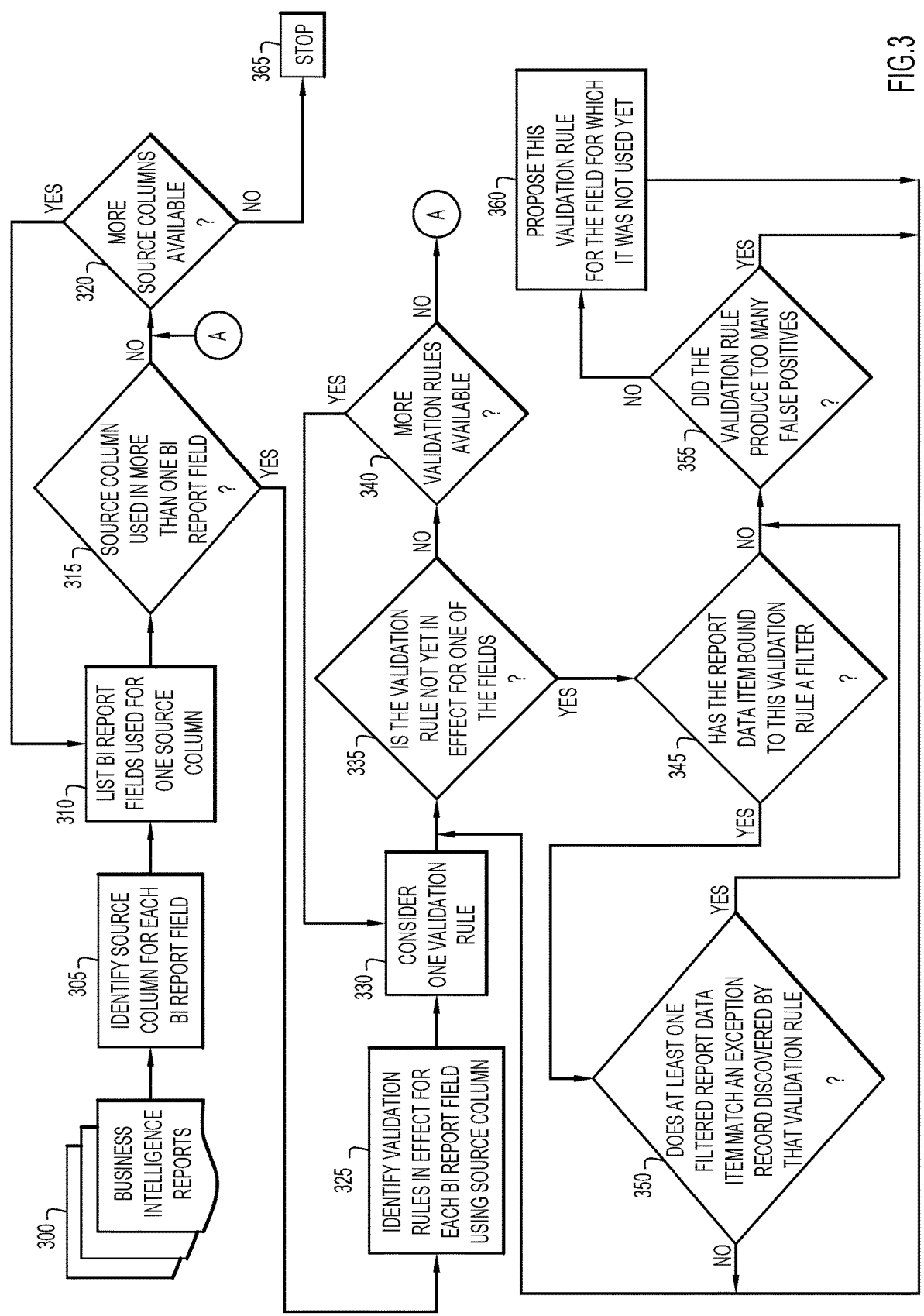
FIG. 3 is a procedural flow chart of a manner of adjusting data quality rules for report fields according to an embodiment of the present invention.

A manner of adjusting application of data quality rules (e.g., via rule module 20 and one or more server systems 10 and/or client systems 14) to fields of a report according to an embodiment of the present invention is illustrated in FIG. 3. The identification of data quality rules for a selected field of a report basically includes discovering existing data quality rules applicable to fields of the same or other reports that receive data from the same source data field providing data to the selected field.

Initially, one or more business intelligence (BI) or other reports 300 are generated (e.g., via report module 16 of one or more server systems 10 and/or client systems 14) each including one or more report fields. A source data field (e.g., a database table column, file data field, etc.) providing data from a corresponding source system 30 is identified for each report field of reports 300 at step 305. This may be accomplished by traversing an associated chain of Extract, Transform, and Load (ETL) processes from a report field to a corresponding source data field as described above. The ETL processes transform data from the source data field for compatibility with the report field.

The source data fields are analyzed to determine report fields associated with (or receiving data from) the same source data field. In particular, one or more corresponding report fields are identified for a source data field at step 310. When the source data field is not associated with more than one report field as determined at step 315, a next source data field is processed at step 310 as described above in response to the existence of additional source data fields as determined at step 320.

When a source data field is identified as being associated with more than one report field as determined at step 315, data quality or validation rules that are bound to the report fields associated with the identified source data field are determined at step 325 (e.g., data quality or validation rules utilized by corresponding Extract, Transform, and Load (ETL) processes, etc.). The determined data quality rules are analyzed to ascertain additional data quality rules for the report fields. In particular, a candidate data quality rule is identified for processing at step 330 from the determined data quality rules for the report fields. When the candidate data quality rule is active for each of the report fields associated with the identified source data field as determined at step 335, a next candidate data quality rule from the determined data quality rules is processed at step 330 as described above in response to the existence of additional determined data quality rules as determined at step 340. In other words, when the candidate data quality rule is already active for each of the report fields associated with the source data field, adding the candidate data quality rule does not enhance data quality and the next candidate data quality rule may be considered. If each of the determined data quality rules has been processed as determined at step 340, the process is repeated for a next source data field at step 310 in response to the existence of additional source data fields as determined at step 320.

When the candidate data quality rule is inactive for at least one of the report fields associated with the identified source data field as determined at step 335, a report field for which the candidate data quality rule is inactive is selected. In this case, since the candidate data quality rule is inactive for a report field associated with the identified source data field, the candidate data quality rule may be added for that report field to provide enhanced data quality as described below.

The candidate data quality rule is applied to data of the selected report field as part of a remediation process (e.g. performed by rule module 20). Exception records are produced that include those data records that do not satisfy the candidate data quality rule. If a filtered report field does not match an exception record (e.g., the filtered report field satisfies the candidate data quality rule, or the filter is beyond the scope of the candidate data quality rule), the candidate data quality rule may be excluded from consideration since inclusion of the candidate data quality rule would not enhance data quality of the selected report field.

Accordingly, the presence of a filter for the selected report field is determined at step 345. If a filter is present, and at least one filtered data item does not match an exception record generated by the candidate data rule as determined at step 350, a next report field for which the candidate data quality rule is inactive is processed as described above in response to the existence of additional report fields as determined at step 335. When each of the report fields for which the candidate data quality rule is inactive has been processed as determined at step 335, a next candidate data quality rule from the determined data quality rules is processed at step 330 as described above in response to the existence of additional determined data quality rules as determined at step 340. If each of the determined data quality rules has been processed as determined at step 340, the process is repeated for a next source data field at step 310 in response to the existence of additional source data fields as determined at step 320.

When the filter is not present as determined at step 345, or the filter exists and at least one filtered data item matches an exception record generated by the candidate data quality rule as determined at step 350, the candidate data quality rule is analyzed for effectiveness in enhancing data quality at step 355. This may be accomplished by analyzing the exception records for the candidate data quality rule within the remediation process (e.g., performed by rule module 20) and determining a data quality improvement caused by the candidate data quality rule that is inactive for the selected report field. For example, the exception records for the candidate data quality rule are presented for correction by the system or an administrator. A number of exception records that are corrected is determined and compared to a threshold. The number of corrected exception records may be utilized to determine a quantity or percentage of false positives (e.g., exception records that do not need correcting but are identified as being an exception or non-compliant with the candidate data quality rule) that indicates an effectiveness or data quality improvement for the candidate data quality rule.

When the quantity or percentage of false positives exceeds the threshold as determined at step 355 (e.g., indicating sufficient effectiveness or data quality improvement), the candidate data quality rule may be added to the set of data quality rules bound to and applied for the selected report field at step 360. If the quantity or percentage does not exceed the threshold as determined at step 355 (e.g., indicating an ineffective data quality rule), or the candidate data quality rule is added to the selected report field at step 360, a next report field for which the candidate data quality rule is inactive is processed as described above in response to the existence of additional report fields as determined at step 335. When each of the report fields for which the candidate data quality rule is inactive has been processed as determined at step 335, a next candidate data quality rule from the determined data quality rules is processed at step 330 as described above in response to the existence of additional determined data quality rules as determined at step 340. If each of the determined data quality rules has been processed as determined at step 340, the process is repeated for a next source data field at step 310 in response to the existence of additional source data fields as determined at step 320.

The above process is repeated, and terminates at step 365 when each of the source data fields have been processed as determined at step 320. The process may dynamically evaluate and adjust application of the data quality rules for report fields (e.g., during report generation, etc.), or may perform these tasks prior or subsequent to report generation or other operations (e.g., at periodic or other intervals, certain times of day, etc.).

Present invention embodiments provide several advantages with respect to memory access and storage, and computer performance or processing. For example, present invention embodiments improve data quality to identify an increased quantity of erroneous or incompatible data records. These data records may be collected and removed from storage to reduce the amount of data records being stored. This increases the amount of available storage for memory allocation, and provides for additional resources and increased speed of memory operations (e.g., searches, maintenance, indexing, storage, etc.).

In addition, the improved data quality ensures presence of compliant data for operations to prevent machine interruptions or crashes in processing due to faulty data. This further reduces the quantity of executions (or processing of the data) since interruptions or crashes require re-initiating (or re-running) the processing, typically from the beginning, thereby processing jobs or tasks faster with utilization of fewer resources.

It will be appreciated that the embodiments described above and illustrated in the drawings represent only a few of the many ways of implementing embodiments for adjusting application of a set of data quality rules based on data analysis.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, report module, rule module, etc.). These systems may include any types of monitors and input devices (e.g., keyboard, mouse, voice recognition, etc.) to enter and/or view information.

It is to be understood that the software (e.g., report module, rule module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., report module, rule module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data quality rules, generated reports, report data, etc.). The database system may be implemented by any number of any conventional or other databases, data stores or storage structures (e.g., files, databases, data structures, data or other repositories, etc.) to store information. The database system may be included within or coupled to the server, client, and/or source systems. The database systems and/or storage structures may be remote from or local to the computer or other processing systems, and may store any desired data (e.g., data quality rules, generated reports, report data, etc.).

The present invention embodiments may employ any number of any type of user interface (e.g., Graphical User Interface (GUI), command-line, prompt, etc.) for obtaining or providing information (e.g., desired report, data quality rules, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information (e.g., business intelligence, etc.) with any quantity of fields or other data units arranged in any fashion, and may be configurable based on rules or other criteria to provide desired information to a user. The report may obtain any data from any desired target data unit (e.g., field, file, database table column or row, cell of a dimensional structure, etc.). The source data may include any data from any desired source data unit (e.g., field, file, database table column or row, cell of a dimensional structure, etc.). The source data may be processed in any desired manner to produce data compatible with a target data unit (e.g., mathematical transformation, logical transformation, character transformations, substitutions, etc.). Any quantity of any types of Extract, Transform, and Load (ETL) or other processes arranged in any order or hierarchy may be utilized to transform the source data for a target data unit.

A report field may be associated with any quantity of target data units and source data units. Any quantity of any types of data quality, validation, or other rules (e.g., formats, valid ranges, data types, etc.) may be bound or associated with target and report fields. Any quantity of rules may added or supplemented to an existing set of rules for a target or report field. Any quantity of report filters may be associated with a target or report field and include any quantity of any desired criteria. The criteria may be based on any quantity of conditions within a corresponding query collecting data for the report. The exception records may be generated by applying any quantity of any types of rules to target data fields, and may represent any degree of non-compliance with a rule.

The remediation process may present exception records in any fashion, where a user or the system, either individually or in any combination, may identify and correct exception records. Any desired metric may be utilized to indicate an effectiveness of a rule (e.g., false positives, quantity of corrected and/or uncorrected records, various ratios of corrected and/or uncorrected records, etc.). The thresholds may be set to any suitable values based on a desired sensitivity for data quality (e.g., enable rules to be added on more occasions, greater selectivity or restricting adding of rules, etc.).

The present invention embodiments are not limited to the specific tasks or algorithms described above, but may be utilized for providing any fields of any types of reports or documents with any desired data quality, validation, or other rules. Further, report fields may be associated based on any desired conditions (e.g., common source or other associated field, data characteristics or attributes, etc.) for identifying candidate rules to add for a report field.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of adjusting application of a set of data quality rules for data within one or more reports comprising:
    selecting, via a processor, a first report field receiving data from a same source data field as at least one second report field within the one or more reports, wherein the first report field and the at least one second report field are associated with different sets of active data quality rules;
    identifying, via the processor, an active data quality rule in a set of active data quality rules associated with the at least one second report field that is inactive for the first report field;
    determining, via the processor, a metric value indicating an effectiveness of the identified data quality rule for data quality of the first report field, wherein the metric value is based on a quantity of correct data records that are indicated as non-compliant with the identified data quality rule and produced from the identified data quality rule being applied to data records for the first report field; and
    adjusting, via the processor, application of the set of active data quality rules for the first report field to include the identified data quality rule from the set of active data quality rules associated with the at least one second report field in response to the metric value of the identified data quality rule satisfying a threshold with respect to the data quality of the first report field.

2. The method of claim 1, wherein the one or more reports include a business intelligence report.

3. The method of claim 1, wherein one or more exception records are generated with data failing to satisfy the identified data quality rule, and wherein the quantity of correct data records that are indicated as non-compliant is based on one from a group of a quantity of exception records being corrected and a quantity of exception records indicating false positives.

4. The method of claim 1, wherein the first report field is filtered based on an associated report filter and one or more exception records are generated with data failing to satisfy the identified data quality rule, and the method further comprises:
    determining the identified data quality rule to be ineffective in response to an absence of an exception record corresponding to the filtered first report field.

5. The method of claim 1, wherein the first report field is filtered based on one or more conditions of an associated report filter, and the method further comprises:
    determining the identified data quality rule to be ineffective in response to the one or more conditions providing the filtered first report field outside a scope of the identified data quality rule.

6. The method of claim 1, further comprising:
    determining a source data field providing data for the first report field by traversing one or more Extract, Transform, and Load (ETL) processes transforming data between the source data field and first report field; and
    identifying the at least one second report field receiving data from the determined source data field.

7. A system for adjusting application of a set of data quality rules for data within one or more reports comprising:
    at least one processor configured to:
        select a first report field receiving data from a same source data field as at least one second report field within the one or more reports, wherein the first report field and the at least one second report field are associated with different sets of active data quality rules;
        identify an active data quality rule in a set of active data quality rules associated with the at least one second report field that is inactive for the first report field;
        determine a metric value indicating an effectiveness of the identified data quality rule for data quality of the first report field, wherein the metric value is based on a quantity of correct data records that are indicated as non-compliant with the identified data quality rule and produced from the identified data quality rule being applied to data records for the first report field; and
        adjust application of the set of active data quality rules for the first report field to include the identified data quality rule from the set of active data quality rules associated with the at least one second report field in response to the metric value of the identified data quality rule satisfying a threshold with respect to the data quality of the first report field.

8. The system of claim 7, wherein the one or more reports include a business intelligence report.

9. The system of claim 7, wherein one or more exception records are generated with data failing to satisfy the identified data quality rule, and wherein the quantity of correct data records that are indicated as non-compliant is based on one from a group of a quantity of exception records being corrected and a quantity of exception records indicating false positives.

10. The system of claim 7, wherein the first report field is filtered based on an associated report filter and one or more exception records are generated with data failing to satisfy the identified data quality rule, and the at least one processor is further configured to:
    determine the identified data quality rule to be ineffective in response to an absence of an exception record corresponding to the filtered first report field.

11. The system of claim 7, wherein the first report field is filtered based on one or more conditions of an associated report filter, and the at least one processor is further configured to:
    determine the identified data quality rule to be ineffective in response to the one or more conditions providing the filtered first report field outside a scope of the identified data quality rule.

12. The system of claim 7, wherein the at least one processor is further configured to:
    determine a source data field providing data for the first report field by traversing one or more Extract, Transform, and Load (ETL) processes transforming data between the source data field and first report field; and
    identify the at least one second report field receiving data from the determined source data field.

13. A computer program product for adjusting application of a set of data quality rules for data within one or more reports, the computer program product comprising a computer readable storage medium having program instructions embodied therewith, the program instructions executable by at least one processor to cause the at least one processor to:
    select a first report field receiving data from a same source data field as at least one second report field within the one or more reports, wherein the first report field and the at least one second report field are associated with different sets of active data quality rules;
    identify an active data quality rule in a set of active data quality rules associated with the at least one second report field that is inactive for the first report field;
    determine a metric value indicating an effectiveness of the identified data quality rule for data quality of the first report field, wherein the metric value is based on a quantity of correct data records that are indicated as non-compliant with the identified data quality rule and produced from the identified data quality rule being applied to data records for the first report field; and
    adjust application of the set of active data quality rules for the first report field to include the identified data quality rule from the set of active data quality rules associated with the at least one second report field in response to the metric value of the identified data quality rule satisfying a threshold with respect to the data quality of the first report field.

14. The computer program product of claim 13, wherein the one or more reports include a business intelligence report.

15. The computer program product of claim 13, wherein one or more exception records are generated with data failing to satisfy the identified data quality rule, and wherein the quantity of correct data records that are indicated as non-compliant is based on one from a group of a quantity of exception records being corrected and a quantity of exception records indicating false positives.

16. The computer program product of claim 13, wherein the first report field is filtered based on an associated report filter and one or more exception records are generated with data failing to satisfy the identified data quality rule, and the program instructions further cause the at least one processor to:
    determine the identified data quality rule to be ineffective in response to an absence of an exception record corresponding to the filtered first report field.

17. The computer program product of claim 13, wherein the first report field is filtered based on one or more conditions of an associated report filter, and the program instructions further cause the at least one processor to:
    determine the identified data quality rule to be ineffective in response to the one or more conditions providing the filtered first report field outside a scope of the identified data quality rule.

18. The computer program product of claim 13, wherein the program instructions further cause the at least one processor to:
    determine a source data field providing data for the first report field by traversing one or more Extract, Transform, and Load (ETL) processes transforming data between the source data field and first report field; and
    identify the at least one second report field receiving data from the determined source data field.

* * * * *